W. H. LAIDLER.
SHEET-METAL GAGE.
No. 179,799.  Patented July 11, 1876.
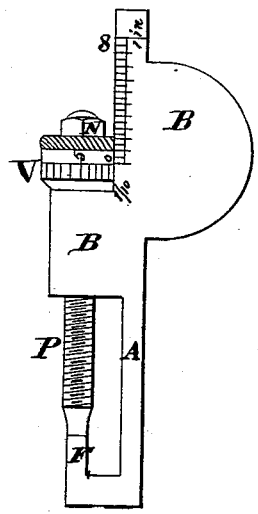
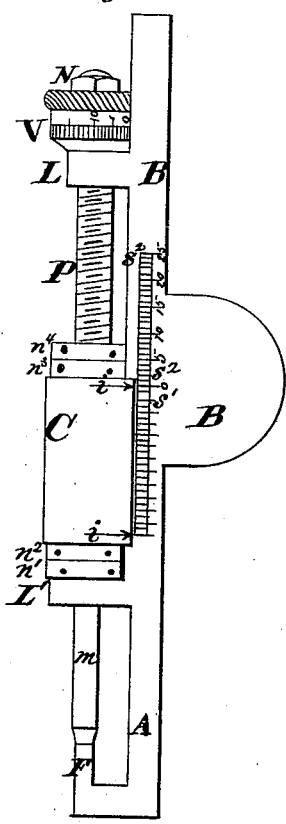
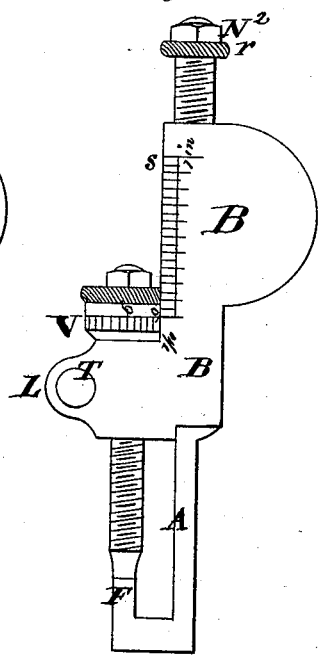
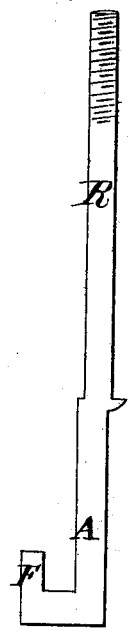
Witnesses:
Michael Ryan
Fred Haynes
W. H. Laidler
by his Attorneys
Brown & Allen

UNITED STATES PATENT OFFICE.

WILLIAM H. LAIDLER, OF BOW COMMON, ENGLAND.

IMPROVEMENT IN SHEET-METAL GAGES.

Specification forming part of Letters Patent No. 179,799, dated July 11, 1876; application filed April 29, 1876.

*To all whom it may concern:*

Be it known that I, WILLIAM HENRY LAIDLER, of Bow Common, in the county of Middlesex, England, have invented an Improved Measuring-Gage; and I do hereby declare that the following is a full, clear, and exact description of the same, reference being had to the accompanying drawing, which forms part of this specification.

The invention supplies a simple and convenient means for measuring the thicknesses of lumber, metal plates, and other materials to which access can be had only on one side, but which admit the introduction of a portion of the measuring instrument or gage through an opening in said material to be measured; and it consists in devices which may be brought to bear against opposite sides of the material or thing to be measured, and which, when so placed, act through other parts of the instrument to indicate the thickness on suitable scales with great accuracy.

The instrument may be applied to measuring thicknesses of all kinds of materials; but it is more especially designed for gaging the thicknesses of plates in steam-boilers, and of the metal plates which form the sides of ships, to which access can be had only by drilling holes through the same, which holes, as they have to be subsequently stopped by plugs, it is desirable should be as small as possible.

It is desirable in making such measurements that the instrument should be of such a kind that it may not only be inserted through a small hole, but that it will not slip through such a hole drilled for its insertion. These conditions have led to certain peculiarities of construction in my invention, the most important of which is that the total width of the arm of the gage and the reverted finger at the end of said arm, (both of which are inserted into and passed through the hole in gaging,) measured together externally and transversely is less than the width of the body of the gage. This feature and other peculiarities of construction are hereinafter more fully set forth.

Figure 1 is a side view of the most simple and easily-constructed gage comprising the features of my invention. Fig. 2 is a side view of a gage having the position of the screw-head changed, and a sliding block to indicate on suitable scales thicknesses of materials measured by said gage. Fig. 3 is a side view of a gage having a modified form of construction, but acting substantially like that shown in Fig. 1. Fig. 4 is a detail of the same.

B is the body of the instrument. The arm A and finger F are attached to the body B, forming part of the same. The total width of the arm A and finger F measured together externally and transversely is less than the width of the body B, so that without danger of dropping through the hole the same can be easily applied through a small hole for measurement without interfering with the burr or rough edge of the material to be measured. The finger F is shown as parallel to the arm A, being joined thereto by a piece of metal at right angles to both the said arm and finger; but instead of this construction, the said arm and finger might be joined by a curved portion and form a hook. A screw, P, is fitted into and plays through the body B, which, when screwed into said body, finally meets the finger F, as shown in Fig. 1. On the top part said screw is fitted with a check-nut, N, and is provided with a graduated head, V. When the graduated head V is turned backward or forward, it will move the point of the screw P upward or downward, and the graduated head V will likewise travel over the scale s, marked on the edge of the body of the instrument B, beginning at $\phi$, the said scale being divided into tenths and twentieth parts of an inch or other divisions, as may be desired; and, in further explanation, supposing the screw-spindle to have a thread the pitch of which is twenty (20) threads to an inch, and the graduated head V twenty-five (25) equal divisions marked on it round its circumference. If the head be moved one division on its circumference, it will indicate an opening of one five-hundredth part of an inch between the point of the screw P and the point of the finger F; and one entire revolution of the head V will show one-twentieth part of an inch on the scale on B. Two revolutions of the head will show one-tenth part of an inch on the scale on B, and so on.

If finer measurements be required, the pitch of the thread on the screw P may be lessened, and the divisions on the head may be made more minute, until the greatest exactness can be attained.

The graduated head V can be adjusted at any time by slacking the check-nut N. The points of the screw P and the finger F can be ground or dressed up true, should they wear, and the head V again adjusted and set true to the scales marked thereon, in conjunction with the scale $s$ on the body of the instrument. In Fig. 2 the arm A and finger F are the same as in Fig. 1. The arrangement of the scales is, however, entirely different. The screw P is screwed and passed through the check-nut N and the head V and through the projections L L'. Upon the said screw are fitted the nuts $n^1$ $n^2$ $n^4$ $n^3$, in each of which a corresponding thread is cut, and between the check-nuts $n^2$ and $n^3$ is fitted loosely on said screw the sliding block C. On the under side of check-nut $n^1$ the thread on the screw P terminates, the spindle $m$ passing loosely through the projection L', and freely down to the point of the finger F.

When the nuts and check-nuts $n^1$, $n^2$, $n^3$, and $n^4$ are screwed up to the sliding block C, the said block will move along said screw as the same is turned to the right or left, the said block sliding freely along and over the edge of the body B. And opposite the indexes $i$, on the sliding block C, will be indicated on the scales $s^1$ $s^2$ on the body B the amount of opening between the point of the screw P and the point of the finger F. On the reverse side of the instrument the sliding block can be arranged in the same manner. The scales on the body being of different measurements—for example, the scale $s^1$ may be arranged and divided into eighths and sixteenth parts of an inch, and the scale $s^2$ may be arranged in twelfths and twenty-fourth parts of an inch, and with two scales on each face of the instrument—the sliding block will be traveling over and indicating four different scales of measurement as the screw is turned.

Suppose the screw P has twenty threads per inch, and the head V fifty divisions on its circumference, the movement of one division backward will show an opening between the points of the screw P and the finger F to be one-thousandth part of an inch. The arrangement of check-nut N and graduated head V is the same for adjustment as in Fig. 1. In Figs. 3 and 4 the arrangement of the screw is the same as in Fig. 1, with the addition of a small tightening-screw, T, the projecting lug L being split up to the screw, and a small piece of wood or other easily-compressible packing fitted in, so that when the screw-spindle becomes slack with wear or other causes, the tightening-screw T will hold the screw with any required rigidity. This form of the gage also differs from the two former described forms by having the arm A and finger F removable. The body of the instrument is drilled through to receive the shank R of the arm A, Fig. 4, the said shank passing through the hole drilled in the body of the instrument, and also through a milled nut, $r$, Fig. 3, the milled nut securing the arm A to the body B, and the check-nut $N^2$ may or may not be used for keeping the milled nut in its position when screwed tightly in its place. The object of this removable arm is that when a measurement is taken the arm A and finger F may be detached from the body B, and taken from the material measured without moving or altering the relative position of the screw P, the head V, and the body B, thus showing the measurement on the scale and head, and the same can be kept in this position for reference, if required. Another object to be gained by the removable arm is, that arms of different lengths can be fitted to the same instrument without extending the scales marked on the body of the instrument.

Having now described the nature of my invention and the manner of using it, I claim—

1. The combination, with the body B and the screw P, of the arm A, and reverted finger F, the total width of such arm and finger, measured together externally and transversely, being less than the width of the body B, substantially as and for the purpose specified.

2. The combination of the body B, provided with one or more scales, $s^1$ $s^2$, the arm A, finger F, screw P, and sliding blocks C, substantially as herein described.

WM. H. LAIDLER.

Witnesses:
W. F. WARREN,
WILMER M. HARRIS.